A. TELFER & W. COLLINS.
Tube-Welding Mandrel.

No. 214,534. Patented April 22, 1879.

Witnesses.
Geo Gray
F. C. Hale

Inventor:
Andrew Telfer
William Collins
by their attorney
F. P. Hale

UNITED STATES PATENT OFFICE.

ANDREW TELFER AND WILLIAM COLLINS, OF BOSTON, MASSACHUSETTS, ASSIGNORS TO SAID ANDREW TELFER.

IMPROVEMENT IN TUBE-WELDING MANDRELS.

Specification forming part of Letters Patent No. 214,534, dated April 22, 1879; application filed July 10, 1876.

*To all whom it may concern:*

Be it known that we, ANDREW TELFER and WILLIAM COLLINS, of Boston, in the county of Suffolk and State of Massachusetts, have invented certain new and useful Improvements in Tube-Welding Mandrels; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

Figure 1:
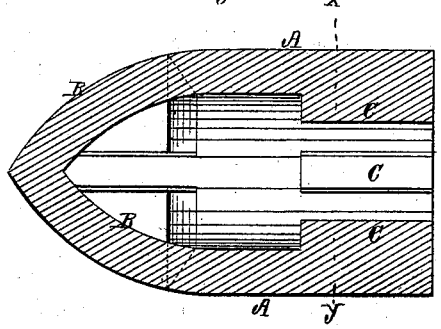
Figure 2:
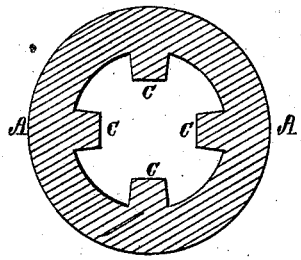

In the drawings, Figure 1 is a central vertical longitudinal section, and Fig. 2 is a vertical transverse section taken on line $x\ y$, Fig. 1, of my improved welding ball or mandrel.

This invention relates to certain new and useful improvements in so-called "welding balls" or mandrels for welding tubing, pipes, &c., having for their principal objects the lessening of the weight of the metal and diminishing the cost of the ball, and the securing a firmer hold of the bar, so as to prevent its unsteadiness and wabbling when adjusted in the end of the welding ball or mandrel.

My invention consists in a hollow welding ball or mandrel, formed at one end, on the interior, with longitudinal lugs or projecting pieces, arranged on the top and bottom and on each side, to form a bearing for the bar, which is inserted in the aperture formed between their faces, the formation of said interior lugs or projections allowing the bar to be admitted farther into the ball, and to be more securely held therein, than is possible by the ordinary formation of a square opening in the end of the ball, as heretofore. Moreover, by the reduction of metal, by the openings formed between the sides of the lugs or interior projections, the quantity of metal used in the construction of the ball is diminished, and its cost is thereby lessened.

In the drawings, A represents a welding ball or mandrel, cast hollow, and, in the present example, formed with a pointed open head, B, the outer periphery of the body and head of the ball being rounded to an even surface; or the ball or mandrel may be of the usual form. At the end of the ball or mandrel, at the top and bottom and on each side of the interior periphery, are formed longitudinal lugs or projections C, rectilinear in shape, and extending inwardly the required distance, and forming between their faces a square opening of sufficient size to admit the insertion and the secure holding of a bar. The formation of the lugs C, as above described, allows the bar to have a more extended, and, therefore, a firmer, bearing within the ball or mandrel than is possible by the ordinary construction, on account of the increase of metal required in extending the bearing of the ordinary square opening to a sufficient depth to securely hold the bar, and the difficulty experienced in the management of the core of the ball should the bearing of the square opening be so extended.

As heretofore constructed, the bearing of the square opening is not of sufficient depth to steadily hold the bar, and much annoyance and imperfect work are caused by its wabbling, whereas by our improvement not only is metal saved by the open spaces between the sides of the lugs or projections, but the latter may be formed of any length desired without interfering with the ready casting of the ball or mandrel, whose outer periphery may be more truly and evenly cast, owing to the steadiness of the bar, than by the ordinary arrangement.

Having thus fully described our improvements, what we claim as our invention, and desire to secure by Letters Patent, is—

A welding ball or mandrel for tubing, having its end formed on the interior with lugs or longitudinal projections C, substantially as and for the purposes described.

In testimony that we claim the foregoing as our own joint invention we affix our signatures in presence of two witnesses.

ANDREW TELFER.
WM. COLLINS.

Witnesses:
F. P. HALE,
F. C. HALE.